US006906699B1

(12) United States Patent
Fåhraeus et al.

(10) Patent No.: US 6,906,699 B1
(45) Date of Patent: Jun. 14, 2005

(54) INPUT UNIT, METHOD FOR USING THE SAME AND INPUT SYSTEM

(75) Inventors: Christer Fåhraeus, Lund (SE); Ola Hugosson, Lund (SE); Petter Ericson, Malmö (SE)

(73) Assignee: C Technologies AB, Lund (SE)

( * ) Notice: Subject to any disclaimer, the term of this patent is extended or adjusted under 35 U.S.C. 154(b) by 0 days.

(21) Appl. No.: 09/673,704

(22) Filed: Oct. 19, 2000

Related U.S. Application Data

(60) Provisional application No. 60/105,780, filed on Oct. 27, 1998, and provisional application No. 60/091,323, filed on Jun. 30, 1998.

(30) Foreign Application Priority Data

Apr. 30, 1998 (SE) .............................................. 9801535
Oct. 9, 1998 (SE) .............................................. 9803455

(51) Int. Cl.⁷ ................................................ G09G 5/00
(52) U.S. Cl. .................... 345/157; 345/156; 345/163; 345/164; 345/165; 345/179; 345/180
(58) Field of Search ................................ 345/156–157, 345/163–167, 179–183; 358/473; 250/227.13, 568, 221; 348/376; 382/186, 187, 182, 171, 178–179

(56) References Cited

U.S. PATENT DOCUMENTS

| 4,797,544 | A | | 1/1989 | Montgomery et al. |
| 4,804,949 | A | * | 2/1989 | Faulkerson ............ 235/462.45 |
| 4,809,351 | A | * | 2/1989 | Abramovitz et al. ........ 235/474 |
| 4,906,843 | A | | 3/1990 | Jones et al. |
| 5,355,146 | A | * | 10/1994 | Chiu et al. .................. 345/156 |
| 5,420,943 | A | | 5/1995 | Mak |
| 5,581,783 | A | | 12/1996 | Ohashi |
| 5,633,489 | A | * | 5/1997 | Dvorkis et al. ........ 235/462.43 |
| 5,835,625 | A | * | 11/1998 | Fitzpatrick et al. ......... 382/165 |
| 5,852,434 | A | * | 12/1998 | Sekendur ..................... 345/179 |
| 5,854,482 | A | * | 12/1998 | Bidiville et al. ............ 250/221 |
| 5,909,209 | A | * | 6/1999 | Dickinson ................... 345/163 |
| 5,991,431 | A | * | 11/1999 | Borza et al. ................ 382/127 |
| 5,994,710 | A | * | 11/1999 | Knee et al. ................. 250/557 |
| 6,172,354 | B1 | * | 1/2001 | Adan et al. ................. 250/221 |
| 6,256,016 | B1 | * | 7/2001 | Piot et al. ................. 144/134.1 |
| 6,281,882 | B1 | * | 8/2001 | Gordon et al. ............. 345/166 |
| 6,304,246 | B1 | * | 10/2001 | Kuth et al. ................. 345/157 |
| 6,392,632 | B1 | * | 5/2002 | Lee ............................ 345/158 |

FOREIGN PATENT DOCUMENTS

| EP | 0692759 A2 | | 1/1996 |
| EP | 07 67443 A2 | * | 9/1996 |
| EP | 0782321 A2 | | 7/1997 |
| NL | 9200329 | | 9/1993 |

OTHER PUBLICATIONS

Yoshihiro Okada, et al., "Method for Document Digitizer by Real–Time Assembling of Mosaic Pictures", Systems–Computers–Controls, vol. 13, No. 5, 1982.

Christer Fåhraeus, Ola Hugosson, and Petter Ericson, U.S. Appl. No. 09/024,641, filed Feb. 17, 1998.

English translation of Netherlands Patent Publication No. 9200329.

* cited by examiner

*Primary Examiner*—Vijay Shankar
*Assistant Examiner*—Leonid Shapiro
(74) *Attorney, Agent, or Firm*—Birch, Stewart, Kolasch & Birch, LLP

(57) ABSTRACT

An input unit has a mouse function and at least one inputting function. The input unit comprises image-recording means (8) which record images. These images are used for providing both the mouse function and the inputting function. The images are processed in the input unit or in some other unit.

29 Claims, 7 Drawing Sheets

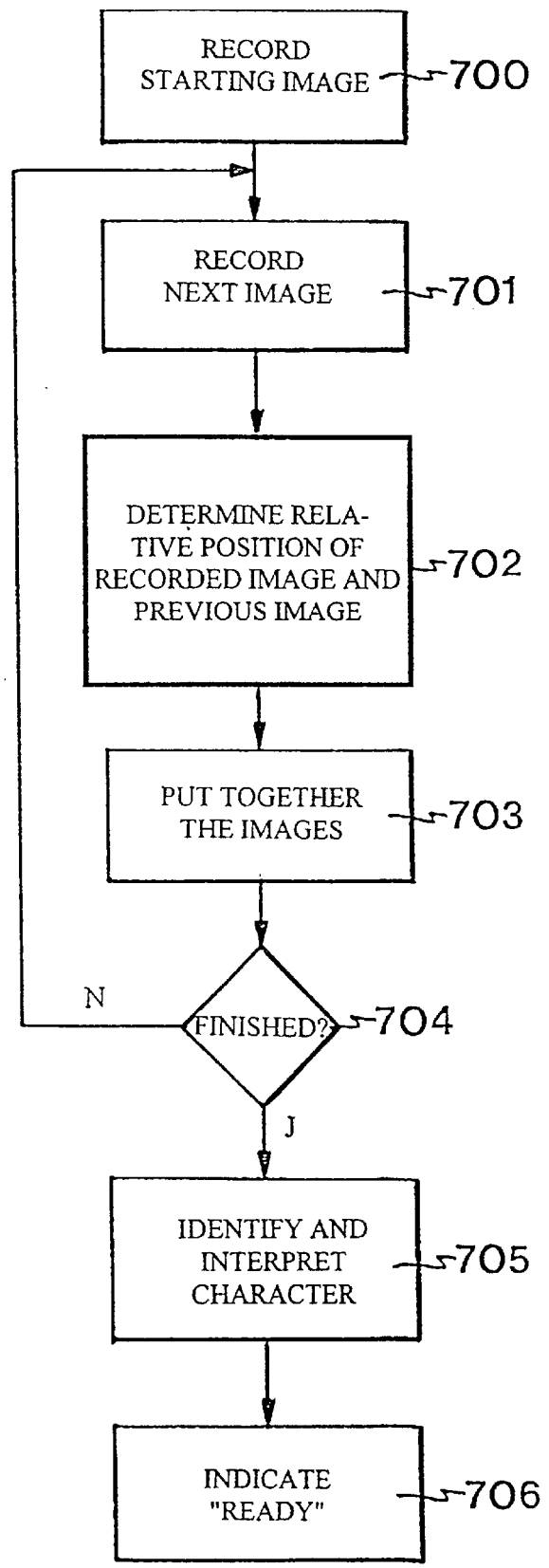

INPUT UNIT, METHOD FOR USING THE SAME AND INPUT SYSTEM

CROSS REFERENCE TO RELATED APPLICATION

This application claims the benefit of U.S. Provisional Application No. 60/091,323, filed Jun. 30, 1998; U.S. Provisional Application No. 60/105,780, filed Oct. 27, 1998; and PCT Application No. PCT/SE99/00718, filed Apr. 30, 1999, which designates the United States.

FIELD OF THE INVENTION

The present invention relates to an input unit having a mouse function and at least one inputting function, which input unit comprises image-recording means for providing the inputting function. The invention also relates to a method for providing a mouse function and at least one inputting function with the aid of an input unit, as well as an input system having a mouse function and at least one inputting function.

BACKGROUND OF THE INVENTION

Today, personal computers are usually equipped with a computer mouse, which is used for positioning a cursor on the computer screen. The positioning is carried out by the user passing the mouse over a surface, the hand movement thus indicating how the mouse should be positioned. The mouse generates positioning signals indicating how the mouse is being moved and thus how the cursor should be moved. For this purpose, the mouse usually has a track ball, which turns as a result of friction against the surface when the mouse is passed over the same and which in this connection drives position sensors which in turn generate the positioning signals. Normally, the mouse can also be used for providing instructions to the computer by the intermediary of one or more buttons on which the user clicks. However, when the term "mouse function" is used below it only refers to the function of positioning a cursor or the like.

To input text and images into a computer a hand-held scanner is sometimes used, which images the text or image which is to be input with the aid of a light-sensitive sensor. The scanner can only image a very limited text/image area at one time. Consequently, in order to record one or several words or a whole image, the scanner must be passed over the text/image and several sub-images must be recorded. Usually, the scanner has some kind of position sensor which determines how these sub-images should be stored in the computer to enable the creation of a composite image therefrom.

It is known to combine a mouse function and an inputting function in a casing which is connected with a single flex to a computer.

U.S. Pat. No. 4,906,843, for example, shows a combined mouse, optical scanner, and digitising pad. In the mouse mode, a track ball is used, which drives two position sensors, which generate the positioning signals. In the scanner mode, a CCD line sensor as well as the position sensors are used for inputting characters or graphical information to the computer.

U.S. Pat. No. 5,355,146 shows a similar input unit with a combined mouse function and scanner function, which also utilises a track ball and a CCD line sensor.

EP 0 782 321 shows yet another input unit having a mouse function and scanner function. In this case, too, a track ball is used for the mouse function but instead of the line sensor, use is made of an area sensor which is capable of imaging a document in a single step and which thus need not be moved across the document. This is said to have the advantage that no software is required for correlating image data with position data.

U.S. Pat. No. 5,633,489 shows a combined mouse and barcode reader, where the mouse function is provided by means of a track ball and the barcode reader comprises a laser diode which generates a laser beam emitted from the underside of the mouse and a photo detector which detects the varying intensity of the reflected light.

All these known input units have a rather complicated mechanical design with moving parts and many sensors. Moreover, they only provide limited synergies between the functions combined in one and the same casing.

SUMMARY OF THE INVENTION

It is thus an object of the present invention to provide an input unit having a mouse function and at least one inputting function as well as a method for providing the mouse function and the inputting function with the aid of the input unit, which input unit and which method reduce the above-mentioned deficiencies.

This object is achieved by an input unit according to claim 1, a method according to claim 19, and an input system according to claim 24. Preferred embodiments are stated in claims 2–18 and claims 20–23 respectively.

An input unit according to the invention thus comprises image-recording means for providing said inputting function, with the image-recording means also being used to provide the mouse function.

Instead of using the image-recording means or only one of these functions, according to the present invention they are used to provide both the mouse function and the inputting function, whereby improved integration of these functions is achieved. Furthermore, the track ball can be omitted and both functions can be based on the same sensor technology so that the signals for both functions can be handled by the same hardware and/or software. Thereby, real integration of the two functions is obtained rather than the two simply being brought together in the same casing as in the prior art. In addition, it becomes possible to provide an input unit without moving parts, which is advantageous from the point of view of durability and manufacturing. As will be evident below, it is also possible to provide an input unit which requires neither special position-determination means nor additional aids in the form of a raster or the like.

In this context, it should be noted that in this patent specification the term inputting function refers to a function whereby the user can input information to a receiver for storing and processing in the same, unlike the mouse function which is used for positioning purposes.

Furthermore, it should be noted that the mouse function can be used for positioning a cursor or the like in a plane or in space.

More specifically, the input unit is advantageously adapted to emit positioning signals for providing the mouse function, as well as inputting signals for providing said inputting function, the positioning signals as well as the inputting signals being based on images recorded by means of the image-recording means. The positioning signals can be used for controlling a cursor on a computer screen, while the inputting signals can contain information which is to be input to the computer.

The positioning signals and the inputting signals can be emitted as electrical signals on leads, as IR signals, as radio signals, or in some other suitable way. Naturally, the input unit can also emit signals other than the positioning signals and the inputting signals, e.g. instruction signals based on clickings. The receiver of the signals can be a computer or some other input unit to which positioning information and/or other information is to be input. The input unit is especially suitable for use with small portable computers where it is desirable to have few, but versatile, accessories.

The image-recording means may comprise a first image-recording unit for providing the mouse function and a second image-recording unit for providing the inputting function. This may be particularly advantageous if different image-recording characteristics are desired for the two functions, e.g. if different foci are desired for the image-recording. For example, when using the mouse function one may wish to be able to move the input unit across a surface in the same way as one would move a traditional mouse, and when using the inputting function one may wish to be able to use the input unit as a camera for imaging objects located at a distance from the unit. In this case, the different image-recording units can be provided with different lens means with different foci. The image-recording units can, for example, be located on different sides of the input unit, but have shared hardware and software.

Alternatively, the image-recording means may comprise an image-recording unit which is used for providing both the mouse function and the inputting function. This embodiment is advantageous because it requires fewer components in the input unit and only one beam path.

The image-recording units may comprise any type of sensor which can be used for recording an image but should preferably be a light-sensitive sensor with a two-dimensional sensor surface, a so-called area sensor.

In a less complex embodiment of the input unit, both the positioning signals and the inputting signals may essentially consist of the actual images recorded by the image-recording means. In this case, essentially all processing of the images takes place in the receiver of the signals, e.g. in a computer. If so, the latter must have software for processing the signals in a suitable manner. Such software may already be stored in the computer or may, for example, be included in the input unit according to the invention and be transferred to the receiver when the input unit is in use.

The receiver of the signals from the input unit must be capable of determining whether the signals are intended as positioning signals or as inputting signals so that it will know how to process the signals. For this purpose, the input unit is adapted to output the positioning signals and the inputting signals in such a way that the receiver can identify whether it is receiving positioning signals or inputting signals. For example, the input unit may use different protocols for the different signals.

Suitably, the input unit should also know whether the user wishes to use the mouse function or the inputting function so that it will know how the images recorded by the image recorder should be processed. For this purpose, the input unit preferably comprises switching means, e.g. a button, which are adapted to switch the input unit between its different functions when acted upon by the user.

Preferably, at least for the mouse function, the image-recording means are adapted to record a plurality of images in such a way that the contents of each image overlap the contents of the previous image, if any. This can be achieved by recording the images with sufficiently high frequency in relation to the expected speed of movement. By virtue of the fact that the images overlap, their relative positions are determined and there is no need to use special position-determination means.

Once the images have been recorded the subsequent processing can take place either in image-processing means in the input unit or in the receiver of the signals from the input unit. The advantages of processing at least the inputting signals in the input unit are that, in this way, the input unit can be used as a stand-alone unit without being connected to an adjacent receiver, that information which has been input can be shown directly on a display on the input unit so that the user can check that the information recorded really is the information he intended to record, and that the information can be transferred in a more compressed format to the receiver. Furthermore, the input unit can be connected to any receiver that supports a mouse with no special software being required in the receiver for processing the images.

Thus, the input unit advantageously comprises image-processing means used for both the mouse function and the inputting function. These image-processing means may comprise a processing unit operating according to different program modules depending upon which function of the input unit is being used.

Moreover, for processing the images in the input unit, the input unit advantageously comprises means for determining the relative position of the images with the aid of the partially overlapping contents. The means for determining the relative position of the images may be included in the shared image-processing means and be implemented by means of software.

If the mouse function is used for linear positioning only, it is sufficient to determine the relative position of the images horizontally. However, if it is to be used for two-dimensional positioning, the relative position must be determined both horizontally and vertically.

In an advantageous embodiment, the input unit comprises means for generating the positioning signals on the basis of the relative position of the images. The positioning signals can, for example, be composed of one or more vectors indicating how the input unit has been moved between the recording of two images, or of one or more positioning coordinates. The means for generating the positioning signals can also be included in the shared image-processing means and be implemented by means of software.

The input unit is advantageously hand-held so that it can be carried everywhere. This technology thus enables the user to have a personal mouse and input unit with stored personal settings and personal information.

In a particularly advantageous embodiment, the input unit also comprises a transmitter for wireless connection of the input unit to a receiver, which further facilitates the use of the input unit. The Bluetooth standard can advantageously be used for this purpose.

Advantageously, the inputting function comprises a scanner function so that the input unit can be used for recording text and/or images.

The inputting function can also comprise a camera function, wherein the image-recording means are utilised for imaging objects located at a distance from the input unit.

The inputting function can also comprise a function for inputting handwritten/drawn, i.e. hand-generated information. Each of the scanner function, the camera function, and the handwriting/drawing function can be the only inputting function or one of several inputting functions.

The input unit can thus have a plurality of functions, all of which are based on images which are recorded by the image-recording means and which are processed efficiently by means of shared hardware and software.

According to a second aspect to the invention, it relates to a method for providing a mouse function and at least one inputting function with the aid of an input unit, comprising the steps of detecting which of said functions is desired; recording at least one image with the aid of the input unit; and processing said at least one image in different ways depending upon which of said functions is desired.

The advantages of the method according to the invention are evident from the above description of the input unit according to the invention.

According to a third aspect of the invention, it relates to an input system having a mouse function and at least one inputting function, comprising image-recording means for recording images and image-processing means for processing the images recorded by the image-recording means for providing the mouse function and said at least one inputting function, the image-recording means being located in a first casing and the image-processing means being located in a second casing.

Accordingly, the input system comprises the case where the image-recording means are located in an input unit and the image-processing means are located in a computer or other receiver to which the input unit is connected and to which it transmits recorded images. Everything that has been stated above with respect to the image-recording means and the processing of the images recorded by the image-recording means also applies to the input system.

BRIEF DESCRIPTION OF THE DRAWINGS

The present invention will now be described in more detail by way of an embodiment with reference to the accompanying drawings, in which FIG. 1 schematically shows an embodiment of an input unit according to the invention;

FIG. 7 is a flowchart of the scanner function;

DESCRIPTION OF A PREFERRED EMBODIMENT

The following is a description of an embodiment of an input unit according to the invention having a mouse function, a scanner function, a camera function, as well as a function for inputting handwritten/drawn information.

Design of the Unit

Figure 1:
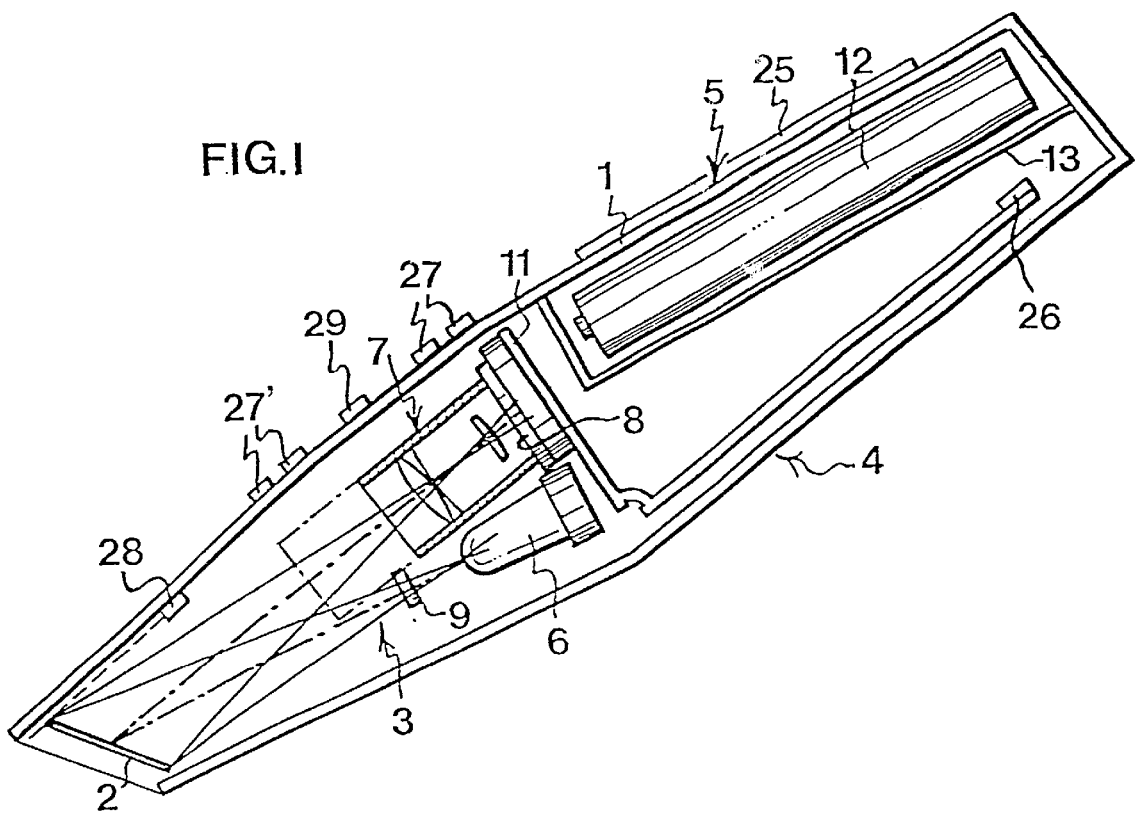

FIG. 1 shows the design of the input unit according to this embodiment. The unit has a casing 1 having approximately the same shape as a conventional high-lighter pen. One short side of the casing has a window 2, by the intermediary of which images are recorded for the various image-based functions of the input unit.

The casing 1 essentially contains an optics part 3, an electronic circuitry part 4, and a power supply 5.

The optics part 3 comprises a light-emitting diode 6, a lens system 7, and an image-recording means in the form of a light-sensitive sensor 8, which constitutes the interface with the electronic circuitry part 4.

The task of the LED 6 is to illuminate a surface which is currently located under the window. A diffuser 9 is mounted in front of the LED 6 for diffusing the light.

The lens system 7 has the task of projecting an image of the surface located under the window 2 on the light-sensitive sensor 8 as accurately as possible. The lens system is displaceable between two positions, the second of which is indicated by dashed lines. The first position is used when images are to be recorded of a surface located directly below the window of the input unit and is primarily intended for the mouse function, the scanner function, and the handwriting/drawing function. The second position is used when images are to be recorded of objects located at a distance from the input unit and is primarily intended for the camera function, but can also be used for the other functions.

In this example, the light-sensitive sensor 8 comprises a two-dimensional, square CCD unit (CCD=charge coupled device) with a built-in A/D converter. Such sensors are commercially available. The sensor 8 is mounted at a small angle to the window 2 and on its own circuit board 11.

The power supply to the input unit is obtained from a battery 12 which is mounted in a separate compartment 13 in the casing.

Figure 2:
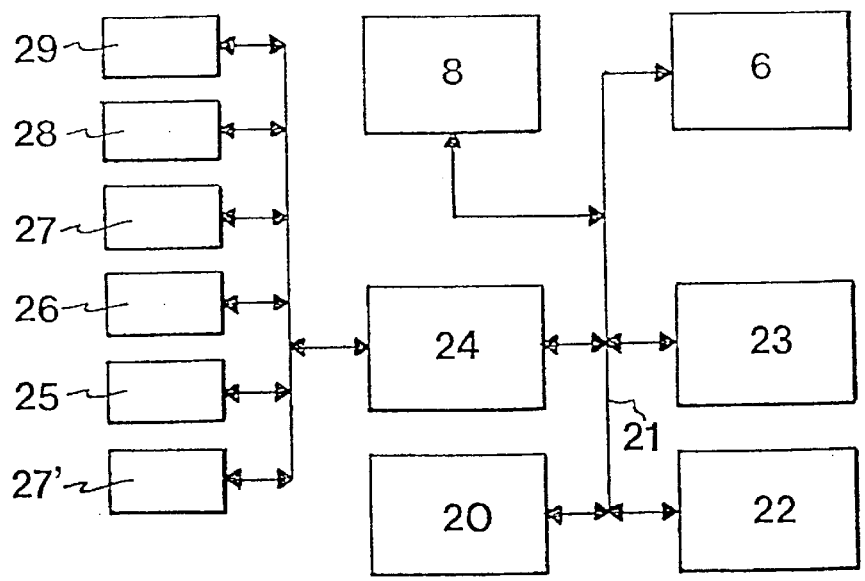
FIG. 2 is a block diagram of the electronic circuitry in an embodiment of an input unit according to the invention.

The block diagram in FIG. 2 schematically shows the electronic circuitry part 4. This comprises a processor 20, which by the intermediary of a bus 21 is connected to a ROM 22, in which the programs of the processor are stored, to a read/write memory 23, which constitutes the working memory of the processor and in which the images from the sensor are stored, to a control logic unit 24, as well as to the sensor 8 and the LED 6. The processor 20, the bus 21, the memories 22 and 23, the control logic unit 24, as well as associated software together constitute image-processing means.

The control logic unit 24 is in turn connected to a number of peripheral units, comprising a display 25, which is mounted in the casing, a radio transceiver 26 for transferring information to/from an external computer, buttons 27, by means of which the user can control the input unit and specifically adjust the input unit between the mouse function, the scanner function, the camera function, and the handwriting/drawing function, buttons 27' corresponding to the clicking buttons on a traditional mouse, a tracer LED 28 which emits a light beam, making it easier for the user to know which information he is inputting, as well as an indicator 29, e.g. an LED, indicating when the pen is ready to be used. Control signals to the memories, the sensor 8, and the peripheral units are generated in the control logic unit 24. The control logic also handles generation and prioritisation of interrupts to the processor. The buttons 27 and 27', the radio transceiver 26, the display 25, the tracer LED 28, and the LED 6 are accessed by the processor writing and reading in a register in the control logic unit 24. The buttons 27 and 27' generate interrupts to the processor 20 when they are activated.

Operation of the Unit

The various functions of the input unit, viz. the mouse function, the scanner function, the handwriting/drawing function, and the camera function, will now be described. All of these functions are based on images which are recorded with the aid of the sensor 8. When the first three functions are used, a plurality of images are recorded in such a way that the contents of each image partially overlap the contents of the previous image, if any. As the images are being recorded, the relative position of the images is determined, i.e. the position which affords the best possible correspondence between their contents. Subsequently, the processing is carried out depending upon the function selected by the user. When recording the images, the input unit can be passed over a surface with the window 2 in contact with the same, or be held at a small or at a larger distance from the surface depending upon the setting of the lens system. The surface need not be plane. For example, it could be a sheet of paper with text on it, a wall covered with patterned wallpaper, or a bowl of sweets. What is important is that images with varying contents can be recorded so that the relative positions of the images can be determined with the aid of the contents of the images.

The Mouse Function

First, suppose that the user wishes to use the input unit as a mouse. In this case, he sets the unit to the mouse function with the aid of the buttons 27, whereupon the input unit starts operating in the mouse mode, and logs into the computer for which the input unit is to operate as a mouse. Subsequently, the user directs the window 2 of the input unit at a patterned surface, e.g. a mouse pad. He presses one of the buttons 27 to activate the input unit, whereupon the processor 20 commands the LED 6 to begin generating strobe pulses at a predetermined frequency, suitably at least 50 Hz. Subsequently, the user passes the input unit over the surface in the same way as if it were a traditional mouse, whereupon images with partially overlapping contents are recorded by the sensor 8 and are stored in the read/write memory 23. The images are stored as images, i.e. with the aid of a plurality of pixels, each having a grey scale value in a range from white to black.

Figure 3:
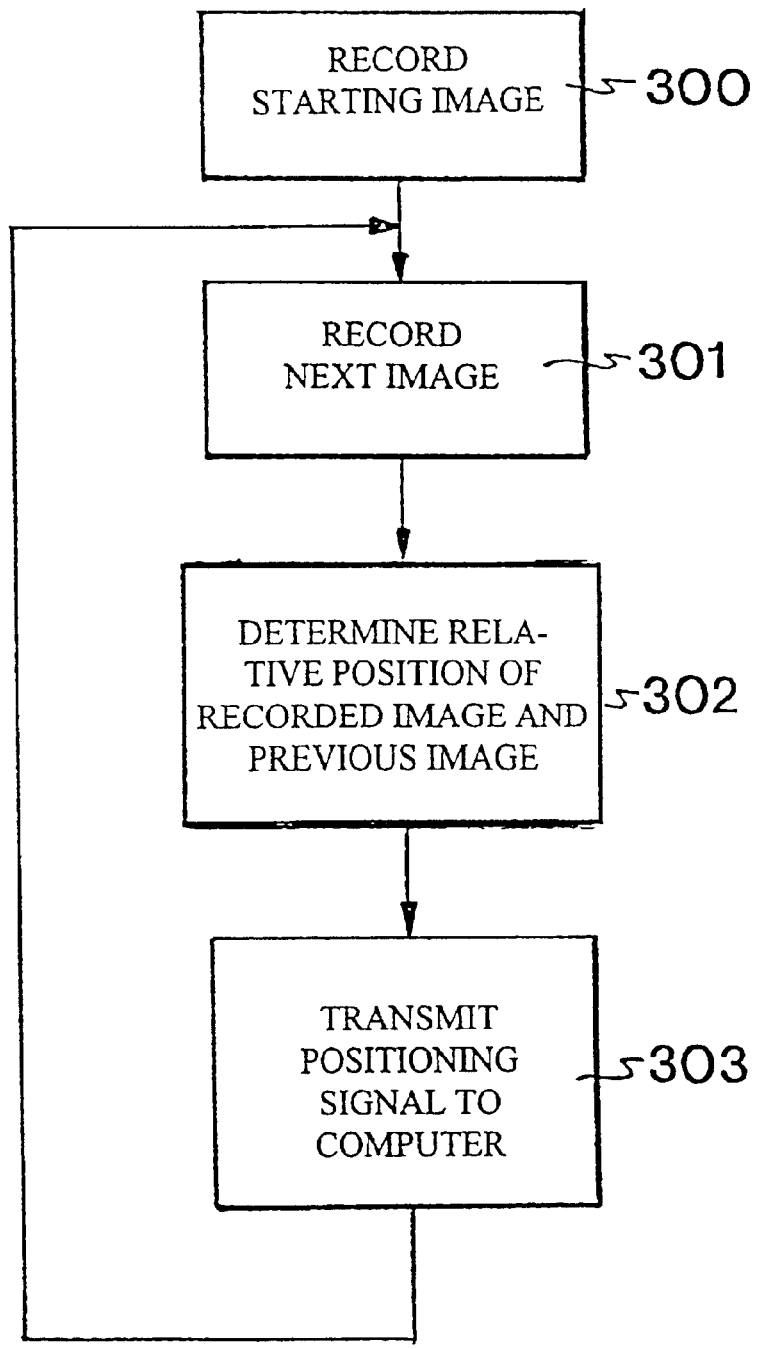
FIG. 3 is a flowchart of the mouse function.

The flowchart in FIG. 3 shows in more detail how the input unit operates when the mouse function is used. In step 300, a starting image is recorded. In step 301, the next image is recorded. The contents of this image partially overlap the contents of the previous image.

As soon as an image has been recorded in step 301, the process begins of determining how it overlaps the previous image both vertically and horizontally, step 302, i.e. in which relative position the best match is obtained between the contents of the images. For this purpose, every possible overlap position between the images is examined, at the pixel level, and an overlap measurement is determined as follows:

1) For each overlapping pixel position, the grey scale values of the two relevant pixels are added up if the latter are not white. Such a pixel position in which none of the pixels are white is designated a plus position.

2) The grey scale sums for all the plus positions are added up.

3) The neighbours of each pixel position are examined. If an overlapping pixel position is not a neighbour of a plus position and consists of a pixel which is white and a pixel position which is not white, the grey scale value of the non-white pixel is subtracted, possibly multiplied by a constant, from the sum in point 2).

4) The overlap position providing the highest overlap measurement as stated above is selected.

Our Swedish patent application No. 9704924-1 and the corresponding U.S. application No. 024,641 describe an alternative way of matching the images in order to find the best overlap position. The content of these applications is herewith incorporated by reference. As soon as the best overlap position between the current image and the previous image has been determined, the previous image is discarded, whereupon the current image becomes the previous image in relation to the next image recorded.

By determining the relative position of the two images a movement vector is obtained, which indicates how far and in which direction the input unit has been moved between the recording of the two images. Subsequently, a positioning signal, which includes this movement vector, is transmitted, step 303, by the radio transceiver 26 to the computer for which the input unit is operating as a mouse. The computer uses the movement vector for positioning the cursor on its screen. Subsequently, the flow returns to step 301. In order to increase the speed, the steps can partly be carried out in parallel, e.g. by starting the recording of the next image while the relative position of the current and the previous image is being determined.

In the mouse mode, the buttons 27' can be used as clicking buttons for inputting instructions to the computer.

The Handwriting and Drawing Function

Next, suppose that the user wishes to input handwritten text to his computer. In this case, with the aid of the buttons 27, he sets the input unit to the handwriting function, whereupon the input unit starts to operate in the handwriting mode. When the user subsequently activates the input unit, the processor 20 commands the LED 6 to begin generating strobe pulses at the predetermined frequency. Subsequently, the user "writes" the text he wishes to input with the input unit directed at the selected surface, whereupon the sensor 8 records images with partially overlapping contents and stores them in the read/write memory 23. The tracer LED 28 successively indicates the path of movement on the surface by means of a luminous spot to give the user an idea of the movement. The text is input one character at a time. Between each character, the user indicates that an information unit has been input, for example by releasing the activating button 27 for a short time or by not moving the input unit for a short time.

Figure 4:
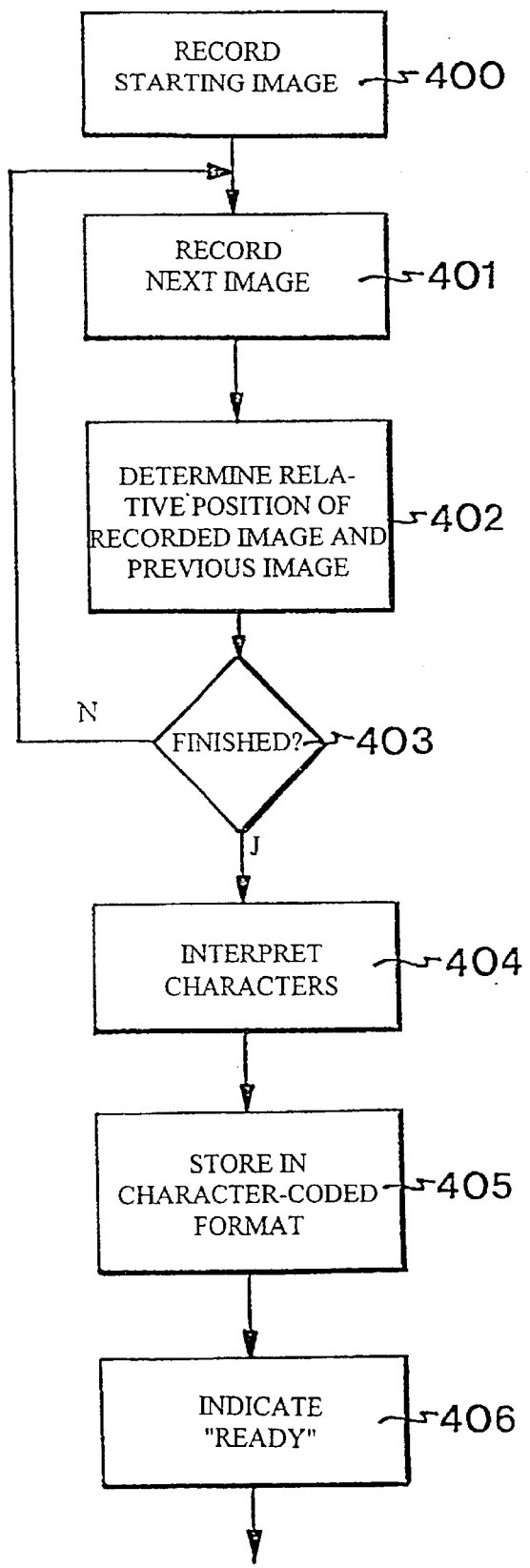
FIG. 4 is a flowchart of the handwriting/drawing function.

FIG. 4 illustrates in more detail how the input unit operates in the handwriting and drawing mode. The first three steps correspond to those carried out in the mouse mode. When the input unit is activated, a starting image is recorded, step 400. The next image, whose contents overlap the previous image, is recorded, step 401, and their relative position is determined, step 402, with the aid of the overlapping contents, whereby a movement vector is obtained.

Subsequently, the processor 20 determines whether the inputting of an information unit is complete or not, step 403. If not, the flow returns to step 401 and the next image is recorded. If the inputting is complete, the processor 20 reads the movement vectors determined for the information unit in question to an OCR (optical character recognition) module which identifies which character the movement vectors represent, step 404. Subsequently, the identified character is stored in character-coded format in the memory, step 405, and the input unit indicates that it is ready to input a new information undo step 406.

The inputted and identified character is preferably transferred to a computer in character-coded format by the intermediary of the radio transmitter 26 and is shown directly on the computer screen. If the input unit is used as a stand-alone unit, the character can be shown on the display 25 instead.

Figure 5:
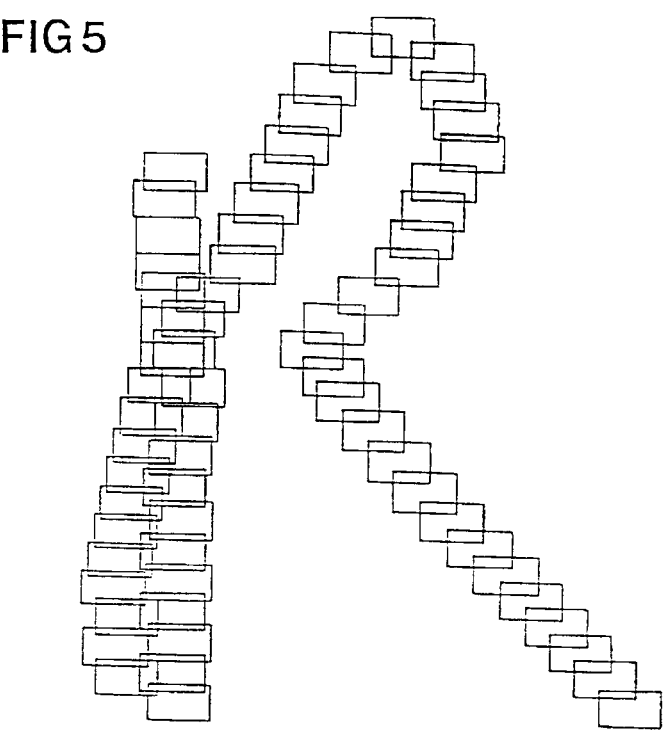
FIG. 5 schematically shows how a surface is imaged in connection with the inputting of handwritten information.

FIG. 5 schematically shows how images with overlapping contents are recorded when the input unit is moved in a path of movement forming the letter "R". For the sake of simplicity, the contents of the images are not shown in FIG. 5.

Figure 6:
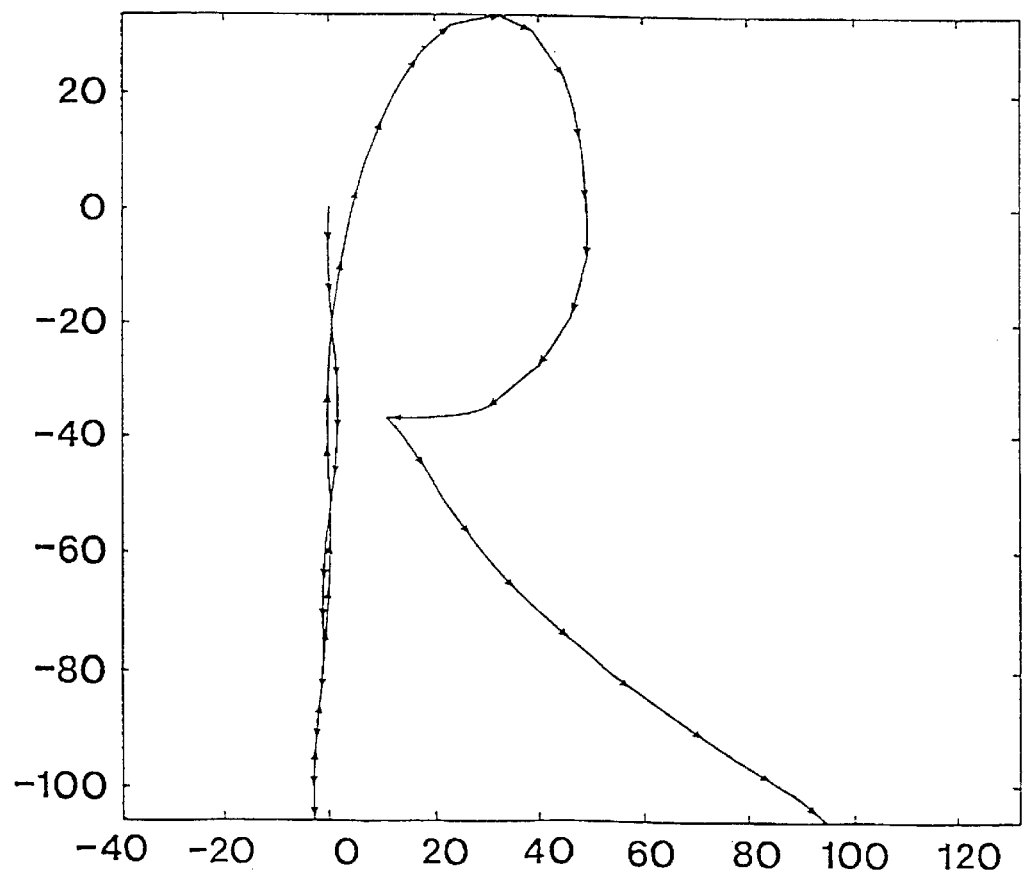
FIG. 6 shows how the handwritten input can be shown on a display.

If, instead, the user indicates that the drawing function is to be used, only steps 400–403 are implemented. FIG. 6 shows how an inputted letter R can be reproduced on the display of the input unit or the computer on the basis of the relative positions of the images in FIG. 5 determined by the input unit when the drawing function is used. In this case, a "drawn image" of the recorded character is shown with the aid of the movement vectors, not an interpreted character. Obviously, arbitrary drawn figures and characters can be input to the input unit or a computer in this manner.

The Scanner Function

Now, suppose that the user wishes to use the input unit for recording predefined text on an information carrier, e.g. a sheet of paper, a newspaper, or a book. In this case, he sets the input unit to the scanner function with the aid of the buttons 27, whereupon the input unit starts operating in the scanner mode.

Subsequently, he directs the input unit at the sheet of paper with the text in the location where he wishes to begin recording text, activates the input unit with the aid of the buttons 27, and passes it over the text which is to be recorded, following the text in the same manner as when one reads the text. The tracer LED 28 emits a light beam which makes it easier to follow the lines. When the user activates the input unit, the processor 20 commands the LED 6 to record images in the same way as described above with respect to the mouse function. When the user has passed the input unit over the selected text or has come to the end of a line or characters, he lifts the unit off the sheet of paper and releases the activating button, whereupon the processor 20 turns off the LED 6.

The flowchart in FIG. 7 illustrates in more detail how the input unit operates in this mode. In step 700, a starting image is recorded. In step 701, a new image is recorded whose contents overlap that of the previous image. In step 702, the best overlap position for the current image and the previous image is determined in the same way as described above with respect to the mouse function. In this position, the images are put together into a whole composite image, step 703. In step 704, the input unit detects whether the inputting of characters is complete. If not, the flow returns to step 701. If the user has released the activating button, indicating that the inputting is complete, the whole composite image is fed as an input signal to an OCR (optical character recognition) software which identifies and interprets the characters in the image, step 705. The identified and interpreted characters are obtained in a predetermined character-code format, e.g. ASCII code, as output signals from the OCR (optical character recognition) software. They are stored in the read/write memory in a memory area for interpreted characters. When the character identification and storing in character-coded form at are finished, the processor activates the indicator 29 to inform the user that it ready to record a new character sequence, step 706.

The interpreted characters can be transferred to a computer or other receiver in character-coded format with the aid of the radio transceiver 26.

The above steps are thus carried out by the processor 20 with the aid of the associated units and suitable software. Such software can be created by the skilled person with the aid of the above instructions if it is not commercially available.

Figures 8A, 8B, 8C:
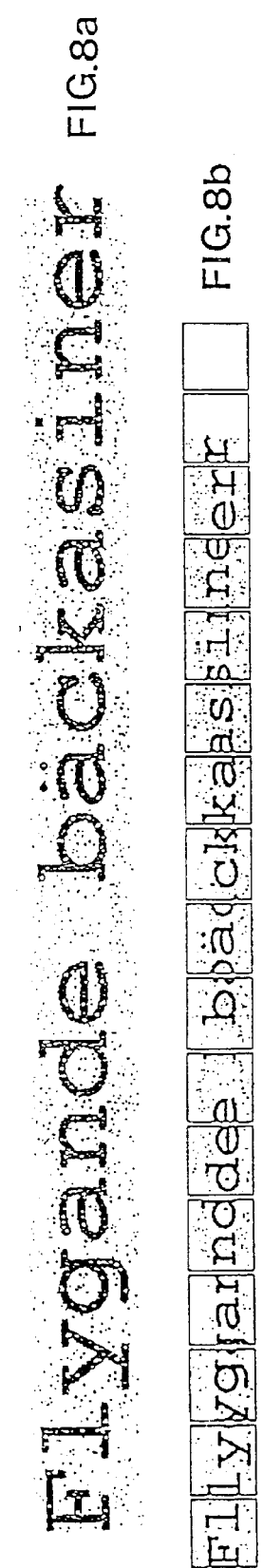
FIGS. 8a–8c schematically show how text is recorded in the scanner mode.

FIGS. 8a–8c illustrate how the input unit operates when the character sequence "Flygande bäckasiner" is recorded. FIG. 8a shows the text on a sheet of paper. FIG. 8b shows the images which are being recorded with the aid of the sensor. As can be seen from this Figure, the contents of the images partially overlap. For example, the letter 1 appears completely in image No. 1 and partially in image No. 2. The degree of overlapping depends on the traction speed, i.e. the speed with which the user passes the input unit over the text in relation to the frequency with which the contents of the sensor 8 are read out. FIG. 8c shows what the whole composite image looks like. It should be noted that the image is still stored in the form of pixels. When the method has been carried out, the text "Flygande bäckasiner" is stored in the read/write memory 23 of the input unit as ASCII code.

The Camera Function

Next, assume that the user wishes to record an image of an object located at a distance from the input unit. The "object" could, for example, be three-dimensional or it could be an image in a book. In this case, the user sets the input unit to the camera function with the aid of the buttons 27, whereupon the input unit begins to operate in the camera mode and the position of the lens system 7 changes to a position suitable for recording images located at a distance from the input unit. Subsequently, the user activates the input unit, whereupon the processor begins to read images from the sensor B. The read images can be shown either on the display 25 of the input unit or on a computer to which the input unit is connected and to which the images are transferred as they are recorded by the intermediary of the radio transceiver 26. When the user is satisfied with the appearance of the image, he presses one of the buttons 27, which then records an image of the object. When the image of the object has been recorded, the user can command the input unit to show the recorded image on the display 25 or to transfer the image to the computer by the intermediary of the radio transceiver 26.

Figure 9:
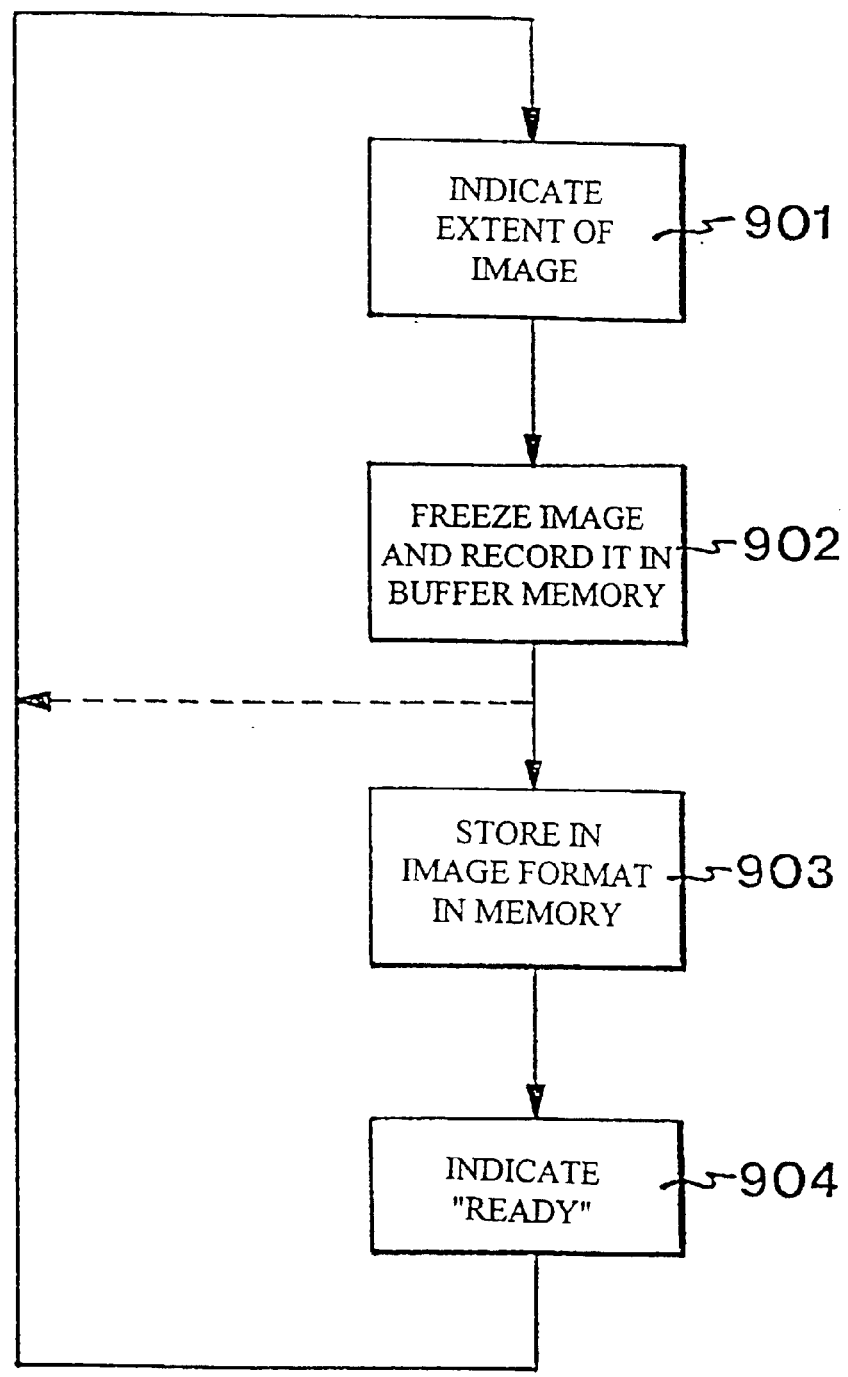
FIG. 9 is a flowchart of the camera function.

The flowchart in FIG. 9 illustrates how the input unit is adapted to operate in the camera mode. In step 901, the extent of the image is indicated on the display 25 of the input unit. When the user is satisfied with the appearance of the image, he presses the button 27, whereupon the image is frozen and recorded in a buffer memory in step 902. The image is recorded with the aid of a plurality of pixels, which can either have grey scale values from white to black or have colour values. The user can then choose whether or not he wishes to keep the current image. If the user decides to keep the image, the process continues along the solid line to step 903, in which the image is stored in the memory 23. When the image has been stored, the unit indicates, in step 904, that it is ready to record a new image. If the user does not wish to keep the image, the process continues, from step 902, along the dashed line back to step 901 in order for a new image to be recorded.

ALTERNATIVE EMBODIMENTS

The above embodiment is described by way of example only. An input unit according to the invention need not comprise all of the functions listed above. It is possible to combine the mouse function with one or more of the scanner function, the camera function, the handwriting function, or other inputting functions.

In the embodiment described above, all processing of recorded information takes place in the input unit. This is not essential. All of the above measures except for the actual image-recording can be carried out with the aid of image-processing means in an external computer or in some other external unit to which the images are transferred.

In the embodiment described above, the recording of images is carried out by means of a single light-sensitive sensor. However, it is also possible to arrange a second light-sensitive sensor, for instance, in the other end of the casing. In this case, it is possible to use one end with the first sensor for the mouse function and the other end with the second sensor for one of the inputting functions.

It is not completely essential for the images to be recorded with overlapping contents in the mouse mode, the handwriting mode and the drawing mode. In these modes, a special substrate with position indications can be used instead. For example, the positions can be written as coordinates, which are read and interpreted for providing positioning signals for a cursor or movement indications enabling the reproduction of a drawn image or a drawn character. However, this has the drawback of requiring a special substrate as well as software for interpreting the position indications.

What is claimed is:

1. An input unit having:
   a mouse function,
   at least one inputting function selected from the group consisting of a scanning function and a function for inputting hand-written/drawn information, and
   image-recording means having an area sensor comprising a plurality of sensing elements, and
   the image-recording means adapted to record with only the area sensor a plurality of images in such a way that content of one of plurality of images partially overlaps content of another of plurality of images, and
   the image-processing means are adapted to determine a relative position of the images with the aid of the partially overlapping contents of the images for both the mouse function and the at least one inputting function, and further, for the mouse function, obtaining positioning information using the relative position, and for the at least one inputting function, processing at least one image of the at least two images in a way which is specific to the at least one inputting function.

2. An input unit according to claim 1, wherein the image processing means are arranged to determine the relative position of the images horizontally as well as vertically.

3. An input unit according to claim 1, further comprising switching means, which, when acted upon by a user, are adapted to select one of the different functions.

4. An input unit according to claim 1, wherein the input unit is hand-held.

5. An input unit according to claim 1, further comprising a transmitter for wireless connection of the input unit to a receiver.

6. An input unit according to claim 1, wherein said inputting function comprises a camera function for imaging objects located at a distance from the input unit.

7. A method for providing a mouse function and at least one inputting function selected from the group consisting of a scanning function and a function for inputting hand-written/drawn information with the aid of an input unit, comprising the steps of:
   detecting which of said functions is selected, recording at least two images with partially overlapping contents with the aid of only one area sensor, comprising a plurality of sensing elements, of the input unit, determining a relative position of the images with the aid of partially overlapping contents of the images, and using information based on the relative position for:
   (1) obtaining a positioning signal and using the positioning signal for controlling a cursor on a computer screen when the mouse function is selected; and
   (2) processing at least one image of said at least two images in a way which specific to the at least one
   inputting function when the at least one inputting function is selected.

8. A method according to claim 7 wherein the step of determining a relative position comprises the step of determining the relative position of the images both horizontally and vertically.

9. A method according to claim 7, in which the at least one inputting function is a character-inputting function and which, when the character-inputting function is selected, further comprises the steps of:
   recording a plurality of images with partially overlapping contents, which images together provide an image of characters which are to be input;
   putting the images together both horizontally and vertically into a composite image;
   identifying the characters in the composite image;
   interpreting the identified characters; and
   storing the interpreted characters in character-coded format.

10. A method according to claim 7, in which the at least one inputting function is a function for inputting hand-written/drawn information and which, when the handwriting/drawing function is selected, further comprises the steps of:
    recording a plurality of images with partially overlapping contents;
    determining relative positions of the plurality of images both horizontally and vertically; and
    determining movement of the input unit on the basis of the relative positions of the plurality of images.

11. A method according to claim 10, further comprising the step of interpreting which character the movement of the input unit represents and storing this character in character-coded format.

12. An input unit according to claim 1, wherein the input unit is an input system and the image-recording means is located in a first casing and the image-processing means is located in a second casing.

13. An input system having:
    a mouse function,
    a scanner function,
    selection means,
        image recording means having an area sensor comprising a plurality of sensing elements, and
        image-processing means, such that:
        the selection means are adapted to determine which of said functions are selected,
        the image-recording means are adapted to record with only the area sensor a plurality of images in such a way that content of one of plurality of images partially overlaps content of another of plurality of images,
        the image-processing means are adapted to determine a relative position of the images with the aid of the partially overlapping contents of the images for both the mouse function and scanner function, and
        the image-processing means are further adapted to:
        (1) provide positioning information for positioning a cursor on the basis of the relative position when the mouse function is selected, and
        (2) put together the plurality of images to form a composite image and to carry out optical character recognition on the basis of the composite image when the scanner function is selected.

14. An input system according to claim 13, wherein said scanner function comprises a function for inputting hand-written/drawn information.

15. An input system according claim 13, wherein the image processing means are arranged to determine the relative position of the images horizontally as well as vertically.

16. An input unit according to claim 1, wherein the image-processing means are further adapted to use information based on the relative position for:
   (1) controlling a cursor on a computer screen when the mouse function is selected; and
   (2) put together the plurality of images to form a composite image and to carry out optical character recognition on the basis of the composite image when the at least one inputting function is selected.

17. An input unit according to claim 1, wherein the image-processing means are further adapted to use the information based on the relative position for:
   (1) controlling a cursor on a computer screen when the mouse function is selected; and
   (2) determining movement of the input unit and to carry out character recognition on the basis of the movement when the at least one inputting function is selected.

18. An input unit having:
   a first mode for performing a mouse function;
   a second mode for performing a scanning function;
   a housing having an interior and a portion admitting light into said interior;
   a single light sensitive area sensor comprising a plurality of sensing elements mounted in said housing and used both for recording positioning information which is used for performing the mouse function, and for imaging information which is to be input into an external unit; and
   a processor;
   said area sensor recording a plurality of images at a predetermined rate such that successive images have partially overlapping content;
   said processor receiving the images recorded by the area sensor and determining the relative positions, corresponding to the best overlapping positions, of the images both in the first or second mode of the input unit;
   said processor producing a position signal for performing the mouse function based on the relative positions of the images when the input unit is in the first mode and a scanning signal for performing the scanning function containing the information imaged by the area sensor when the input unit is in the second mode.

19. The input unit of claim 18, including at least one switch for switching said input unit between said first mode and said second mode.

20. The input unit of claim 18 further comprising a camera function for imaging objects located at a distance from the input unit.

21. The input unit of claim 18 wherein the input unit is pen-shaped.

22. An input unit having:
   a first mode for performing a mouse function;
   a second mode for performing a handwriting capture function;
   a housing having an interior and a portion admitting light into said interior;
   a single light sensitive area sensor comprising a plurality of sensing elements mounted in said housing and used both for recording positioning information which is used for performing the mouse function, and for imaging information which is to be input into an external unit; and
   a processor;
   said area sensor recording a plurality of images at a predetermined rate such that successive images have partially overlapping content;
   said processor receiving the images recorded by the area sensor and determining the relative positions, corresponding to the best overlapping positions, of the images both in the first or second mode of the input unit;
   said processor producing a position signal for performing the mouse function based on the relative positions of the images when the input unit is in the first mode and a handwriting capture signal for performing the handwriting capture function containing the information imaged by the area sensor when the input unit is in the second mode.

23. The input unit of claim 22 including at least one switch for switching said input unit between said first mode and said second mode.

24. The input unit of claim 22 further comprising a camera function for imaging objects located at a distance from the input unit.

25. The input unit of claim 22 wherein the input unit is pen-shaped.

26. A method of operating an input unit comprising the steps of:
   selecting either a first mode for performing a mouse function or a second mode for performing a scanning function;
   providing a single light sensitive area sensor comprising a plurality of light sensing elements;
   recording with the area sensor a plurality of images at a predetermined rate such that successive images have partially overlapping content;
   providing a processor operatively connected to the area sensor;
   determining from the plurality of images received by the processor the relative positions, corresponding to the best overlapping positions, of the images;
   producing a position signal based on the relative positions of the images for performing the mouse function when the input unit is in the first mode; and
   producing a scanning signal containing the information imaged by the area sensor for performing the scanning function when the input unit is in the second mode.

27. The method of claim 26 comprising the additional step of providing the input unit with a camera function for imaging objects located at a distance from the input unit.

28. A method of operating an input unit comprising the steps of:
   selecting either a first mode for performing a mouse function or a second mode for performing a handwriting capture function;
   providing a single light sensitive area sensor comprising a plurality of light sensing elements;
   recording with the area sensor a plurality of images at a predetermined rate such that successive images have partially overlapping content;
   providing a processor operatively connected to the area sensor;

determining from the plurality of images received by the processor the relative positions, corresponding to the best overlapping positions, of the images;

producing a position signal based on the relative positions of the images for performing the mouse function when the input unit is in the first mode; and producing a handwriting capture signal containing the information imaged by the area sensor for performing the handwriting capture function when the input unit is in the second mode.

29. The method of claim 28 comprising the additional step of providing the input unit with a camera function for imaging objects located at a distance from the input unit.

* * * * *